April 2, 1968     W. WAGNER ET AL     3,376,091
COMPACT WIDE-ANGLE CAMERA OBJECTIVE
Filed Aug. 12, 1964
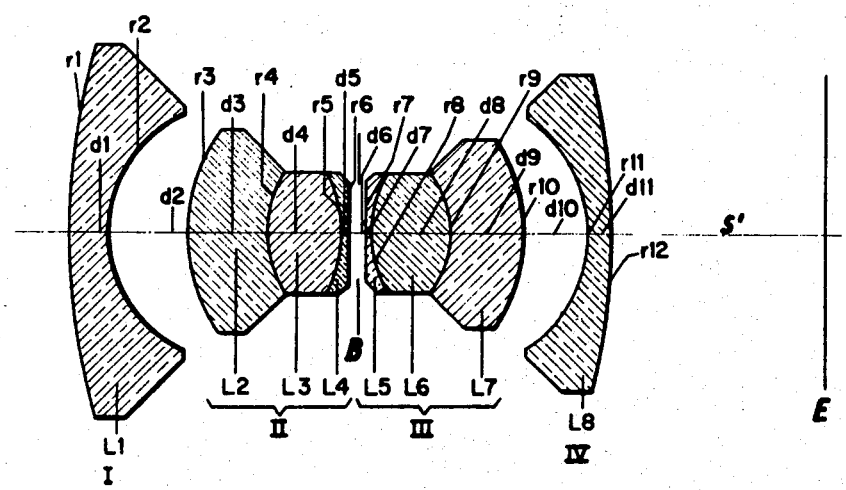
Werner Wagner
Karl H. Macher
*Inventors.*
Karl G. Ross
AGENT

United States Patent Office 3,376,091
Patented Apr. 2, 1968

3,376,091
COMPACT WIDE-ANGLE CAMERA OBJECTIVE
Werner Wagner, Odernheim (Glan), and Karl Heinrich Macher, Bad Kreuznach, Germany, assignors to Jos. Schneider & Co. Optische Werke, Kreuznach (Rhineland), Germany, a corporation of Germany
Filed Aug. 12, 1964, Ser. No. 388,997
Claims priority, application Germany, Aug. 14, 1963,
Sch 33,712
2 Claims. (Cl. 350—209)

ABSTRACT OF THE DISCLOSURE

Optical objective with an outer pair of dispersive lens members and an inner pair of collective lens members, the latter being in the form of triplets each consisting of a positive lens sandwiched between two negative lenses; the negative lens members are meniscus-shaped singlets with outer surfaces having radii of curvature larger than those of any of the surfaces except the confronting inner surfaces of the triplets.

---

Our present invention relates to an optical objective system designed for high-quality image projection upon a relatively wide area, i.e. with a field angle of at least 90°.

In commonly owned U.S. Patent No. 2,781,695, issued Feb. 19, 1957 to G. Klemt, there has been disclosed an objective system with an image angle of about 100°; the system consists of four air-spaced lens members including an inner pair of collective members and an outer pair of dispersive members bracketing the inner pair, these components being positioned substantially symmetrically around a diaphragm space enclosed by the members of the inner pair. With this prior system, however, the relative aperture is limited to a ratio of 1:8.

An improved objective system of this general type has been disclosed and claimed in U.S. Patent No. 2,897,725, issued Aug. 4, 1959 to the aforesaid G. Klemt and K. H. Macher; the latter system, in which the meniscus-shaped singlets constituting the outer members of the earlier disclosure are replaced by doublets, affords an aperture ratio of 1:4.

Furthermore, in a copending application by K. H. Macher filed Feb. 15, 1962, Ser. No. 173,409, now Patent No. 3,209,649 there has been disclosed still another improvement of a system of this character whereby even larger aperture ratios, up to 1:3.4, were realized with field angles of 90°. The objective systems of that copending application and of the aforementioned patent No. 2,897,725 to Klemt and Macher require, however, rather heavy lenses so that the total axial length of the four-component assembly is greater than twice the overall focal length of the system.

The general object of our present invention is to provide an optical system of the type disclosed in the copending application wherein the drawback of large total axial length with reference to the overall focal length is eliminated.

A more specific object of our invention is to provide an improved system of this type in which, through a redimensioning of the lens elements and the intervening air spaces, an axial length approximately equal to the overall focal length is realized with maintenance of an improved aperture ratio in comparison with the system of the first-mentioned Klemt patent and with good correction for spherical, chromatic and comatic aberrations as well as reduction of field curvature, the objective still having a wide image angle substantially matching that of the system disclosed in the Klemt-Macher patent.

The improved objective system according to our invention consists, in common with the system of the aforementioned copending application, of four air-spaced components represented by an inner pair of collective lens members enclosing a diaphragm space and an outer pair of dispersive lens members encompassing the inner pair, each dispersive member being a meniscus-shaped singlet turning its more strongly curved surface toward the inner pair and preferably having radii of curvature whose ratio is approximately equal to 1:5; the two collective members are represented by a front and a rear triplet each composed of a positive lens sandwiched between an inner negative lens adjacent the diaphragm space and an outer negative lens remote from that space, the refractive indices of the lenses of each triplet increasing progressively in magnitude from the diaphragm space outward. Furthermore, again as disclosed in the copending application, the refractive index of the outer negative lens of each triplet advantageously exceeds that of the inner negative lens thereof by a minimum of about 0.12 unit and that of the adjoining negative lens by a minimum of substantially 0.08 unit, thereby affording a particularly good correction for coma.

In accordance with the present improvement, the sum of the axial thickness of the inner negative lenses adjoining the diaphragm space is not greater than about 0.03 times the overall focal length of the system, these negative lenses being concave toward the diaphragm space. By this means it is possible to suppress coma, astigmatism and field curvature in a system with considerably foreshortened axial length as compared with the system of the copending application. In order to reduce this axial length to substantially the magnitude of the overall focal length of the system, the air spaces separating the two outer components from the two inner components should, according to a further feature of the invention, have a combined width less than substantially 30% of the overall focal length.

Whereas in the system of the copending application it has been found desirable to choose the glasses of the outer negative lens and the positive lens of each triplet in such a way that the Abbe numbers $\nu$ of these lenses in the rear triplet exceed the Abbe numbers of the corresponding lenses in the front triplet by at least 8 units, the reverse is true in a system embodying our present improvement. Thus it is another feature of our invention that the $\nu$ value of the outer negative lens and of the positive lens of one triplet differ from those of the corresponding lenses of the other triplet by not more than 8 units for optimum chromatic performance.

The sole figure of the accompanying drawing illustrates diagrammatically an embodiment of the invention exhibiting the above features.

The figure shows a first dispersive member I consisting of a single meniscus-shaped lens L1 with radii $r1$, $r2$ and thickness $d1$, separated by an air space $d2$ from the first collective component II. The latter is a triplet composed of an outer negative lens L2 (radii $r3$, $r4$ and thickness $d3$), a positive lens L3 (radii $r4$, $r5$ and thickness $d4$) and an inner negative lens L4 (radii $r5$, $r6$ and thickness $d5$) adjoining a diaphragm space $d6$ with diaphragm B. Beyond this diaphragm space there is positioned a collective rear triplet III composed of an inner negative lens L5 (radii $r7$, $r8$, thickness $d7$), a positive lens L6 (radii $r8$, $r9$ and thickness $d8$) and an outer negative lens L7 (radii $r9$, $r10$, thickness $d9$). Separated from this triplet by an air space $d10$ is a rear dispersive member IV again consisting of a single meniscus-shaped lens L8, with radii $r11$, $r12$ and thickness $d11$. The vertex of the outer surface of lens L8 is spaced from the image plane E by the back-focal length $s'$.

The parameters $r1$ to $r12$ and $d1$ to $d11$, the indices of refraction $n_d$ and the Abbe numbers $\nu$ of lenses L1 to L8 may have numerical values as given in the following Table I and Table II, each of these tables defining an objective system having an aperture ratio of 1:5.6, an overall focal length of 100 linear units (e.g. mm.) and an effective field angle of 100°; the back-focal length $s'$ equals 68.46 units in the system of Table I and 67.98 units in the system of Table II.

TABLE I

| | | | | $n_d$ | $\nu_d$ |
|---|---|---|---|---|---|
| I | L1 | $r1 = +122.75$ | $d1 = 7.04$ | 1.46450 | 65.8 |
| | | $r2 = +25.49$ | $d2 = 14.65$ | Air space | |
| II | L2 | $r3 = +34.89$ | $d3 = 13.00$ | 1.71700 | 47.9 |
| | L3 | $r4 = +20.90$ | $d4 = 16.48$ | 1.61405 | 55.1 |
| | L4 | $r5 = -21.48$ | $d5 = 1.48$ | 1.56138 | 45.3 |
| | | $r6 = +360.27$ | $d6 = 2.96$ | Air space (diaphragm) | |
| III | L5 | $r7 = -1052.61$ | $d7 = 1.48$ | 1.56883 | 56.0 |
| | L6 | $r8 = +23.84$ | $d8 = 14.27$ | 1.61375 | 56.3 |
| | L7 | $r9 = -16.29$ | $d9 = 12.89$ | 1.70181 | 41.1 |
| | | $r10 = -34.74$ | $d10 = 12.04$ | Air space | |
| IV | L8 | $r11 = -25.98$ | $d11 = 4.27$ | 1.52015 | 63.6 |
| | | $r12 = -128.32$ | $d_{total} = 100.56$ | | |

TABLE II

| | | | | $n_d$ | $\nu_d$ |
|---|---|---|---|---|---|
| I | L1 | $r1 = +127.95$ | $d1 = 7.17$ | 1.46450 | 65.8 |
| | | $r2 = +25.54$ | $d2 = 14.87$ | Air space | |
| II | L2 | $r3 = +35.13$ | $d3 = 15.42$ | 1.71700 | 47.9 |
| | L3 | $r4 = +20.56$ | $d4 = 13.83$ | 1.61405 | 55.1 |
| | L4 | $r5 = -21.67$ | $d5 = 1.10$ | 1.56138 | 45.3 |
| | | $r6 = +361.41$ | $d6 = 2.95$ | Air space (diaphragm) | |
| III | L5 | $r7 = -1056.86$ | $d7 = 1.10$ | 1.56470 | 55.8 |
| | L6 | $r8 = +23.95$ | $d8 = 14.45$ | 1.61375 | 56.3 |
| | L7 | $r9 = -16.46$ | $d9 = 13.40$ | 1.70181 | 41.1 |
| | | $r10 = -34.95$ | $d10 = 12.25$ | Air space | |
| IV | L8 | $r11 = -25.94$ | $d11 = 4.26$ | 1.52015 | 63.6 |
| | | $r12 = -124.29$ | $d_{total} = 100.80$ | | |

As will be noted from the foregoing tables, the axial thickness $d5$, $d7$ of the inner negative lenses L4 and L5 is in each case less than 1.5 units so that their sum is smaller than 3% of the overall focal length. It will also be seen that the air spaces $d2$ and $d10$, separating the outer components I, IV from the adjacent inner components II and III, are each less than 15 units wide so that their combined width is less than 30% of the overall focal length. Finally the total axial length $d_{total}$ approximately equals the overall focal length in each case.

Departures from the exact structure herein disclosed and especially from the specific numerical values given in the foregoing tables are of course possible and are deemed to come within the spirit and scope of the invention as defined in the appended claims.

We claim:

1. An optical objective system consisting of four air-spaced members including an inner pair of collective members enclosing a diaphragm space and an outer pair of dispersive members encompassing said inner pair, said dispersive members being meniscus-shaped single front and rear lenses and turning their more strongly curved surfaces toward said inner pair, said collective members being constituted by a front triplet and a rear triplet each composed by a positive lens sandwiched between an inner negative lens adjacent said diaphragm space and an outer negative lens remote from said diaphragm space, the radii $r1$ to $r12$ of said single front lens L1, said outer negative lens L2 of said front triplet, said positive lens L3 of said front triplet, said inner negative lens L4 of said front triplet, said inner negative lens L5 of said rear triplet, said positive lens L6 of said rear triplet, said outer negative lens L7 of said rear triplet and said single rear lens L8, the axial thicknesses and spacings $d1$ to $d11$ of said lenses, their indices of refraction $n_d$ and their Abbe numbers $\nu$ having numerical values substantially as given in the following table:

| | | | | $n_d$ | $\nu_d$ |
|---|---|---|---|---|---|
| L1 | $r1 = +122.75$ | $d1 = 7.04$ | 1.46450 | | 65.8 |
| | $r2 = +25.49$ | $d2 = 14.65$ | Air space | | |
| L2 | $r3 = +34.89$ | $d3 = 13.00$ | 1.71700 | | 47.9 |
| L3 | $r4 = +20.90$ | $d4 = 16.48$ | 1.61405 | | 55.1 |
| L4 | $r5 = -21.48$ | $d5 = 1.48$ | 1.56138 | | 45.3 |
| | $r6 = +360.27$ | $d6 = 2.96$ | Air space (diaphragm) | | |
| L5 | $r7 = -1052.61$ | $d7 = 1.48$ | 1.56883 | | 56.0 |
| L6 | $r8 = +23.84$ | $d8 = 14.27$ | 1.61375 | | 56.3 |
| L7 | $r9 = -16.29$ | $d9 = 12.89$ | 1.70181 | | 41.1 |
| | $r10 = -34.74$ | $d10 = 12.04$ | Air space | | |
| L8 | $r11 = -25.98$ | $d11 = 4.27$ | 1.52015 | | 63.6 |
| | $r12 = -128.32$ | | | | |

2. An optical objective system consisting of four air-spaced members including an inner pair of collective members enclosing a diaphragm space and an outer pair of dispersive members encompassing said inner pair, said dispersive members being meniscus-shaped single front and rear lenses and turning their more strongly curved surfaces toward said inner pair, said collective members being constituted by a front triplet and a rear triplet each composed by a positive lens sandwiched between an inner negative lens adjacent said diaphragm space and an outer negative lens remote from said diaphragm space, the radii $r1$ to $r12$ of said single front lens L1, said outer negative lens L2 of said front triplet, said positive lens L3 of said front triplet, said inner negative lens L4 of said front triplet, said inner negative lens L5 of said rear triplet, said positive lens L6 of said rear triplet, said outer negative lens L7 of said rear triplet and said single rear lens L8, the axial thicknesses and spacings $d1$ to $d11$ of said lenses, their indices of refraction $n_d$ and their Abbe numbers $\nu$ having numerical values substantially as given in the following table:

| | | | $n_d$ | $\nu_d$ |
|---|---|---|---|---|
| L1 | $r1 = +127.95$ | $d1 = 7.17$ | 1.46450 | 65.8 |
| | $r2 = +25.54$ | $d2 = 14.87$ | Air space | |
| L2 | $r3 = +35.13$ | $d3 = 15.42$ | 1.71700 | 47.9 |
| L3 | $r4 = +20.56$ | $d4 = 13.83$ | 1.61405 | 55.1 |
| L4 | $r5 = -21.67$ | $d5 = 1.10$ | 1.56138 | 45.3 |
| | $r6 = +361.41$ | $d6 = 2.95$ | Air space (diaphragm) | |
| L5 | $r7 = -1056.86$ | $d7 = 1.10$ | 1.56470 | 55.8 |
| L6 | $r8 = +23.95$ | $d8 = 14.45$ | 1.61375 | 56.3 |
| L7 | $r9 = -16.46$ | $d9 = 13.40$ | 1.70181 | 41.1 |
| | $r10 = -34.95$ | $d10 = 12.25$ | Air space | |
| L8 | $r11 = -25.94$ | $d11 = 4.26$ | 1.52015 | 63.6 |
| | $r12 = -124.29$ | | | |

References Cited

UNITED STATES PATENTS

Re. 25,497  12/1963  Baluteau _____ 350—220

DAVID H. RUBIN, *Primary Examiner.*

JEWELL PEDERSON, *Examiner.*